United States Patent
Xu

(10) Patent No.: US 9,041,880 B2
(45) Date of Patent: May 26, 2015

(54) OPTICAL COMPENSATED BENDING MODE LIQUID CRYSTAL DISPLAY PANEL AND METHOD FOR MANUFACTURING THE SAME

(75) Inventor: Liang Xu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 135 days.

(21) Appl. No.: 13/501,638

(22) PCT Filed: Mar. 14, 2012

(86) PCT No.: PCT/CN2012/072292
§ 371 (c)(1),
(2), (4) Date: Apr. 12, 2012

(87) PCT Pub. No.: WO2013/127101
PCT Pub. Date: Sep. 6, 2013

(65) Prior Publication Data
US 2013/0222751 A1    Aug. 29, 2013

(30) Foreign Application Priority Data
Feb. 29, 2012  (CN) .......................... 2012 1 0050102

(51) Int. Cl.
G02F 1/1337  (2006.01)
G02F 1/139   (2006.01)

(52) U.S. Cl.
CPC ............... *G02F 1/133788* (2013.01); *G02F 2001/133749* (2013.01); *G02F 1/1395* (2013.01)

(58) Field of Classification Search
CPC ................................. G02F 1/133788
USPC .................................................. 349/128
See application file for complete search history.

(56) References Cited

U.S. PATENT DOCUMENTS

| | | | |
|---|---|---|---|
| 7,382,959 B1 * | 6/2008 | Jacobsen | 385/129 |
| 2006/0202162 A1 * | 9/2006 | Lin et al. | 252/299.4 |
| 2008/0014372 A1 * | 1/2008 | Lin et al. | 428/1.1 |
| 2009/0290078 A1 * | 11/2009 | Yang et al. | 349/16 |
| 2010/0118234 A1 * | 5/2010 | Chu | 349/88 |
| 2010/0149446 A1 * | 6/2010 | Fujisawa et al. | 349/38 |

* cited by examiner

*Primary Examiner* — Edward Glick
*Assistant Examiner* — Alexander Gross
(74) *Attorney, Agent, or Firm* — Mark M. Friedman

(57) ABSTRACT

The present invention provides an optical compensated bending (OCB) mode liquid crystal display (LCD) panel and a method for manufacturing the same. The method comprises the following steps: forming alignment layers on substrate, respectively; forming a liquid crystal layer between the alignment layers to form a liquid crystal cell; applying an electrical signal across the liquid crystal cell; and irradiating light rays to or heating the liquid crystal cell, so as to form a first polymer alignment layer and a second polymer alignment layer, respectively. The present invention can reduce a phase transition time of liquid crystal molecules from a splay state to a bent state.

6 Claims, 6 Drawing Sheets

OPTICAL COMPENSATED BENDING MODE LIQUID CRYSTAL DISPLAY PANEL AND METHOD FOR MANUFACTURING THE SAME

FIELD OF THE INVENTION

The present invention relates to a field of a liquid crystal display technology, and more particularly to an optical compensated bending (OCB) mode liquid crystal display (LCD) panel and a method for manufacturing the same.

BACKGROUND OF THE INVENTION

Liquid crystal displays (LCDs) have been widely applied in electrical products. Currently, most LCDs are backlight type LCDs which comprise a liquid crystal display panel and a backlight module. The liquid crystal display panel is composed of two transparent substrates and a liquid crystal sealed there-between.

At present, since an OCB mode liquid crystal display (LCD) can have advantages of a fast response speed and a broad viewing angle, the OCB mode is suitable for LCD displays. However, when a higher voltage difference is applied to the OCB mode liquid crystal display (LCD), the liquid crystal molecules therein will transit from a splay state to a bend state, and the molecules are required to spend some time for the transition above.

As a result, it is necessary to provide an OCB mode liquid crystal display (LCD) panel and a method for manufacturing the same to solve the problems existing in the conventional technologies, as described above.

SUMMARY OF THE INVENTION

The present invention provides an OCB mode LCD panel and a method for manufacturing the same, so as to solve the problems of the conventional OCB mode LCD.

A primary object of the present invention is to provide a method for manufacturing an OCB mode LCD panel, and the method comprises the following steps: forming a first alignment layer on a first substrate, and forming a second alignment layer on a second substrate; forming a liquid crystal layer between the first alignment layer and the second alignment layer to form a liquid crystal cell, wherein the liquid crystal layer includes reactive monomers and liquid crystal molecules, and the liquid crystal molecules are arranged in a splay state; applying an electrical signal across the liquid crystal cell such that the reactive monomers and the liquid crystal molecules are arranged in a bend state; and irradiating light rays to or heating the liquid crystal cell such that the reactive monomers are bonded to the first alignment layer and the second alignment layer, so as to form a first polymer alignment layer and a second polymer alignment layer, respectively.

Another object of the present invention is to provide a method for manufacturing an OCB mode LCD panel, and the method comprises the following steps: forming a first alignment layer on a first substrate, and forming a second alignment layer on a second substrate; forming a liquid crystal layer between the first alignment layer and the second alignment layer to form a liquid crystal cell, wherein the liquid crystal layer includes reactive monomers and liquid crystal molecules, and the liquid crystal molecules are arranged in a splay state; applying an electrical signal across the liquid crystal cell such that the reactive monomers and the liquid crystal molecules are arranged in a bend state; irradiating light rays to or heating the liquid crystal cell such that the reactive monomers are bonded to the first alignment layer and the second alignment layer, so as to form a first polymer alignment layer and a second polymer alignment layer, respectively, wherein the first polymer alignment layer and the second polymer alignment layer have a pre-tile angle within a range of 0 to 10 degrees; and irradiating light rays to or heating incompletely-reacted reactive monomers in the liquid crystal cell.

A further object of the present invention is to provide an OCB mode LCD panel, and the OCB mode LCD panel comprises: a first substrate comprising a first electrode, a first alignment layer and a first polymer alignment layer, wherein the first alignment layer and the first polymer alignment layer are formed on the first electrode in sequence; a second substrate comprising a second electrode, a second alignment layer and a second polymer alignment layer, wherein the second alignment layer and the second polymer alignment layer are formed on the second electrode in sequence; and a liquid crystal layer formed between the first polymer alignment layer and the second polymer alignment layer to form a liquid crystal cell, wherein liquid crystal molecules of the liquid crystal layer are arranged in a bend state.

In one embodiment of the present invention, the method further comprises the follow step: after irradiating light rays to the liquid crystal cell, removing the irradiated light rays and the applied electrical signal.

In one embodiment of the present invention, after forming the first polymer alignment layer and the second polymer alignment layer, polymer chains of the first polymer alignment layer are connected to polymer chains of the second polymer alignment layer.

In one embodiment of the present invention, after applying the electrical signal across the liquid crystal cell and before forming the first polymer alignment layer and the second polymer alignment layer, an intensity of the applied electrical signal is raised.

In one embodiment of the present invention, the first polymer alignment layer and the second polymer alignment layer have a pre-tile angle within a range of 0 to 10 degrees.

In one embodiment of the present invention, the method further comprises the follow step: irradiating light rays to or heating incompletely-reacted reactive monomers in the liquid crystal cell.

In one embodiment of the present invention, the method further comprises the follow step: controlling a time of irradiating light rays to the liquid crystal cell, so as to control a length of polymer chains of the first polymer alignment layer and the second polymer alignment layer.

In one embodiment of the present invention, the polymer chains of the first polymer alignment layer and polymer chains of the second polymer alignment layer both incline toward the same side of the liquid crystal cell.

The OCB mode liquid crystal display panel of the present invention and the method for manufacturing the same can pre-form polymer alignment layers in the liquid crystal cell, such that the liquid crystal molecules of the liquid crystal cell can be pre-arranged in the bend state for eliminating or reducing the phase transition time thereof from the splay state to the bent state, so as to improve the quality of the OCB mode liquid crystal display panel.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
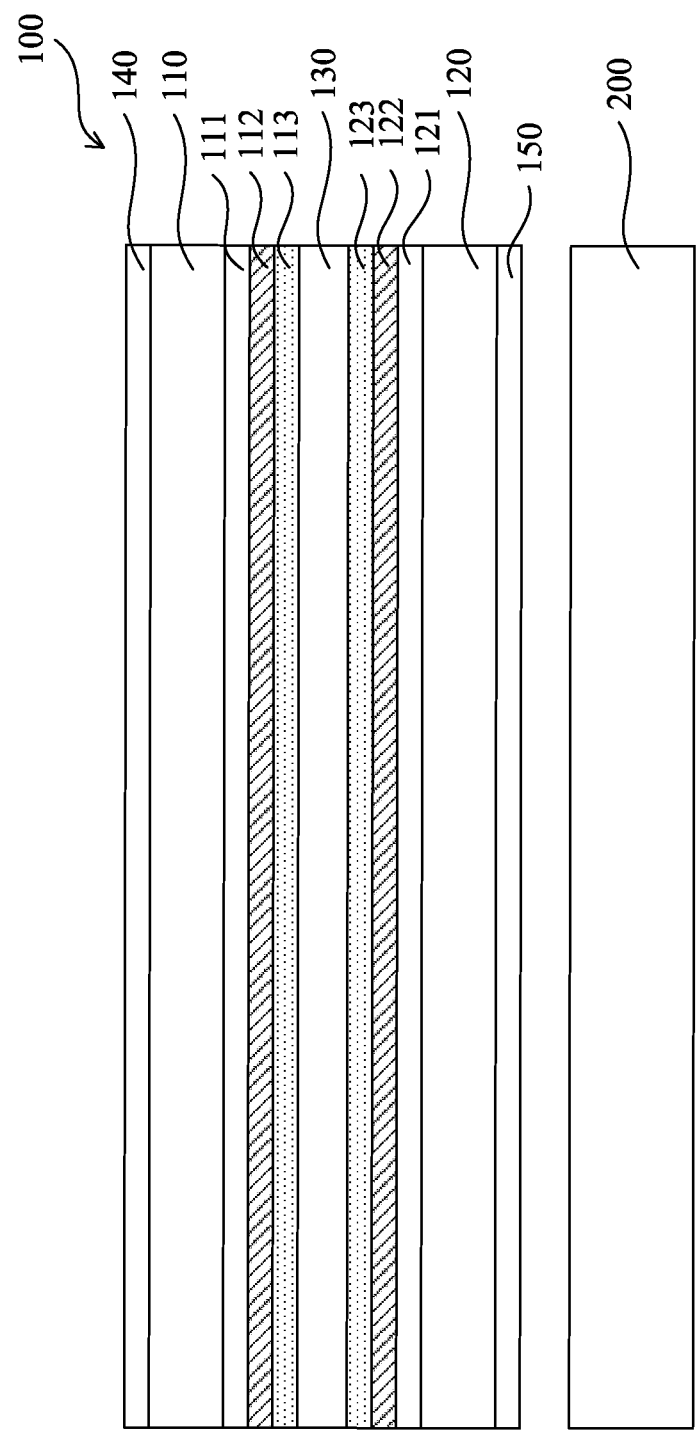
FIG. 1 is a cross-sectional view showing an OCB mode LCD panel and a backlight module according to an embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a cross-sectional view showing an OCB mode liquid crystal display (LCD) panel and a backlight module according to an embodiment of the present invention is illustrated. The liquid crystal display apparatus of the present embodiment can comprise the OCB mode LCD panel 100 and the backlight module 200. The OCB mode LCD panel 100 is disposed opposite to the backlight module 200, and the backlight module 200 may be realized as an edge lighting backlight module or a bottom lighting backlight module to provide the OCB mode LCD panel 100 with the back-light.

Referring to FIG. 1 again, the OCB mode LCD panel 100 of the present embodiment may comprise a first substrate 110, a second substrate 120, a liquid crystal layer 130, a first polarizer 140 and a second polarizer 150. The first substrate 110 and the second substrate 120 may be realized as glass substrates or flexible plastic substrates. In this embodiment, the first substrate 110 may be a glass substrate or other material substrate with color filters (CF), and the second substrate 120 may be a glass substrate or other material substrate with a thin film transistor (TFT) array. The first substrate 110 may comprises a plurality of gate lines, a plurality of data lines and a plurality of pixel structures (not shown). The gate lines and the data lines are arranged in a crisscross pattern, thereby forming pixel regions arranged in a matrix manner. The pixel structures are disposed in the pixel regions, respectively. It notes that the CF and the TFT array may be disposed on the same substrate in other embodiments.

Figure 2:
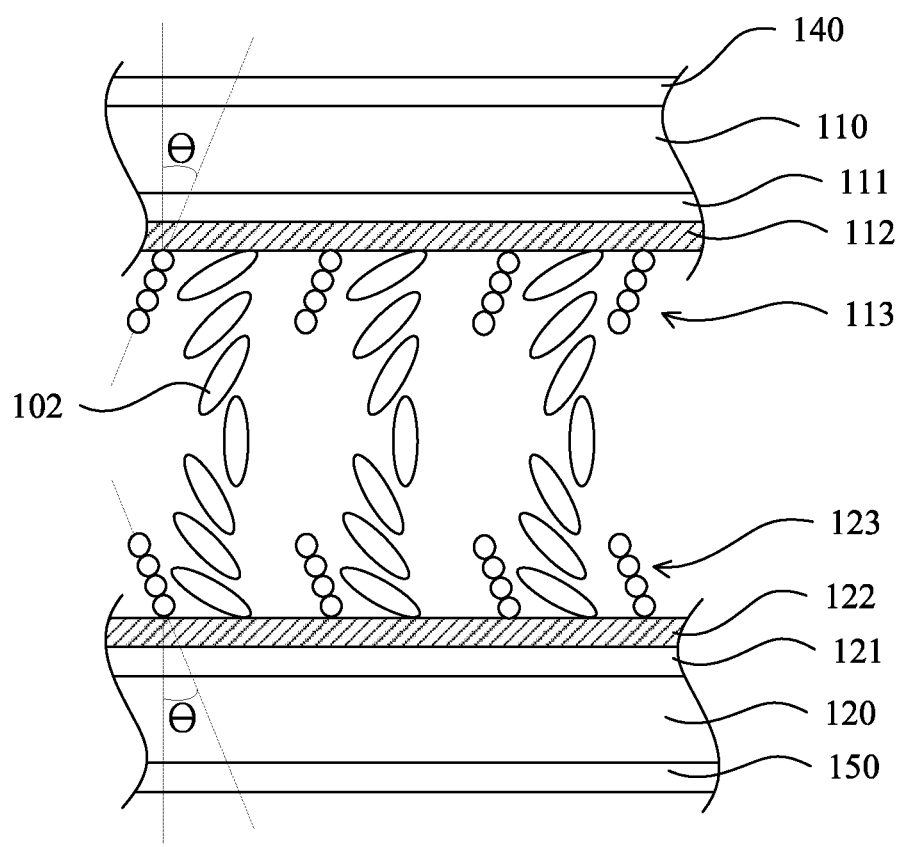
FIG. 2 is a partially cross-sectional view showing the OCB mode LCD panel according to the embodiment of the present invention.

Referring to FIG. 2, a partially cross-sectional view showing the OCB mode LCD panel according to the embodiment of the present invention is illustrated. The liquid crystal layer 130 is formed between the first substrate 110 and the second substrate 120 and includes reactive monomers 101 and liquid crystal molecules 102. The reactive monomers 101 are preferably photo-sensitive monomers mixed with the liquid crystal molecules 102, and the liquid crystal molecules 102 may be positive liquid crystal molecules. The first polarizer 140 is disposed on one side of the first substrate 110 and opposite to the liquid crystal layer 130 (as a light-emitting side). The second polarizer 150 is disposed on one side of the second substrate 120 and opposite to the liquid crystal layer 130 (as a light-incident side).

Referring to FIG. 2 again, in this embodiment, the first substrate 110 can comprise a first electrode 111, a first alignment layer 112 and a first polymer alignment layer 113. The first alignment layer 112 and the first polymer alignment layer 113 are formed on the first electrode 111 in sequence. The second substrate 120 can comprise a second electrode 121, a second alignment layer 122 and a second polymer alignment layer 123. The second alignment layer 122 and the second polymer alignment layer 123 are formed on the second electrode 121 in sequence. The first electrode 111 and the second electrode 121 are preferably made of a transparent and electrically conductive material, such as ITO, IZO, AZO, GZO, TCO or ZnO. A voltage can be applied to the liquid crystal molecules 102 of the liquid crystal layer 130 through the first electrode 111 and the second electrode 121. In this embodiment, the first electrode 111 may be a common electrode, and the second electrode 121 may be a pixel electrode. In addition, the second electrode 121 can have a plurality of regions (not shown), and the voltages which are applied to the regions may be the same or different. The alignment layers 112, 122 and the polymer alignment layers 113, 123 can have an alignment direction for determining the orientation of the liquid crystal molecules of the liquid crystal layer 130. The alignment layers 112, 122 and the polymer alignment layers 113, 123 can have a pre-tile angle $\theta$, wherein the pre-tile angle $\theta$ is less than 90 degrees, preferably in the range of 0 to 10 degrees. The materials of the alignment layers 112, 122 may be polyimide (PI) or silicon dioxide ($SiO_2$). The polymer alignment layers 113, 123 are polymerized of the reactive monomers 101 and bonded to the alignment layers 112, 122. At this time, the liquid crystal molecules 102 are arranged in a bend state between the polymer alignment layers 113 and 123.

Figure 3:
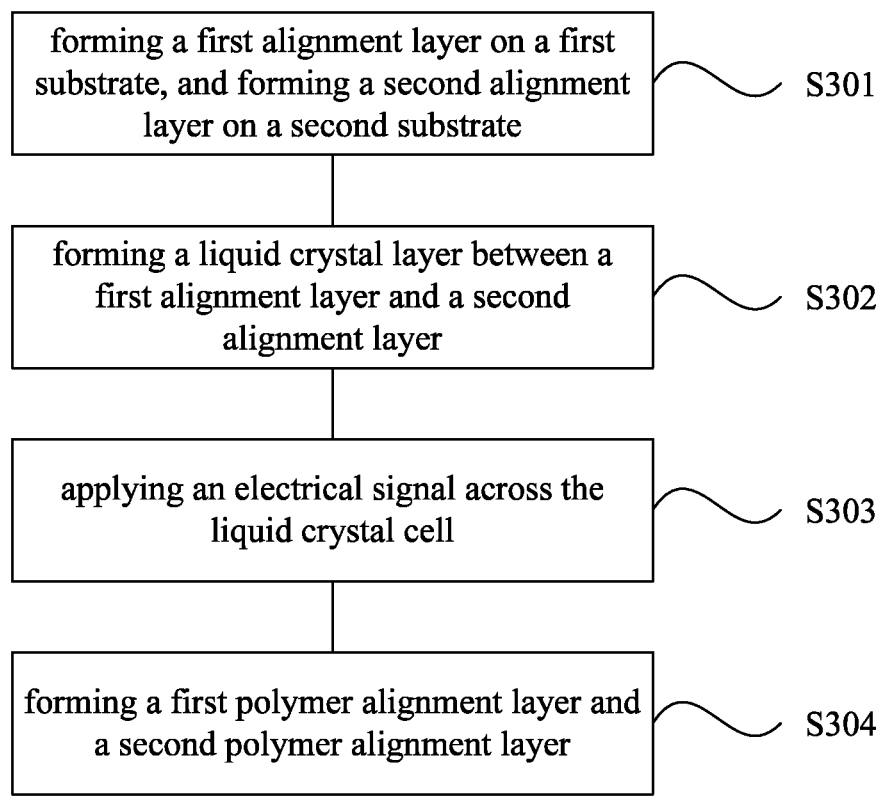
FIG. 3 is a flow diagram showing a method for manufacturing the OCB mode LCD panel according to the embodiment of the present invention.

Referring to FIG. 3, a flow diagram showing a method for manufacturing the OCB mode LCD panel according to the embodiment of the present invention is illustrated. When manufacturing the OCB mode LCD panel 100 in this embodiment, the first alignment layer 112 is first formed on the first substrate 110, and the second alignment layer 122 is formed on the second substrate 120 (step S301). Before the step S301, the first electrode 111 is formed on the first substrate 110, and the second electrode 121 is formed on the second substrate 120. Furthermore, before the step S301, the substrates 110, 120 having the electrodes 111, 121 can be pre-cleaned and pre-cured, so as to clean the surfaces of the substrates 110, 120 (i.e. the surfaces of the electrodes 111, 121). In the step S301, the alignment layers 112 and 122 can be formed on the electrodes 111, 121 of the substrates 110, 120 by coating, printing, ink-jet printing or sputtering (for $SiO_2$). Subsequently, the alignment layers 112 and 122 can be rubbed by a rubbing machine, such that the alignment layers 112 and 122 can have the predetermined alignment direction. By rubbing the alignment layers 112 and 122, the alignment layers 112 and 122 can have the pre-tile angle within the range of 0 to 10 degrees.

Figure 4:
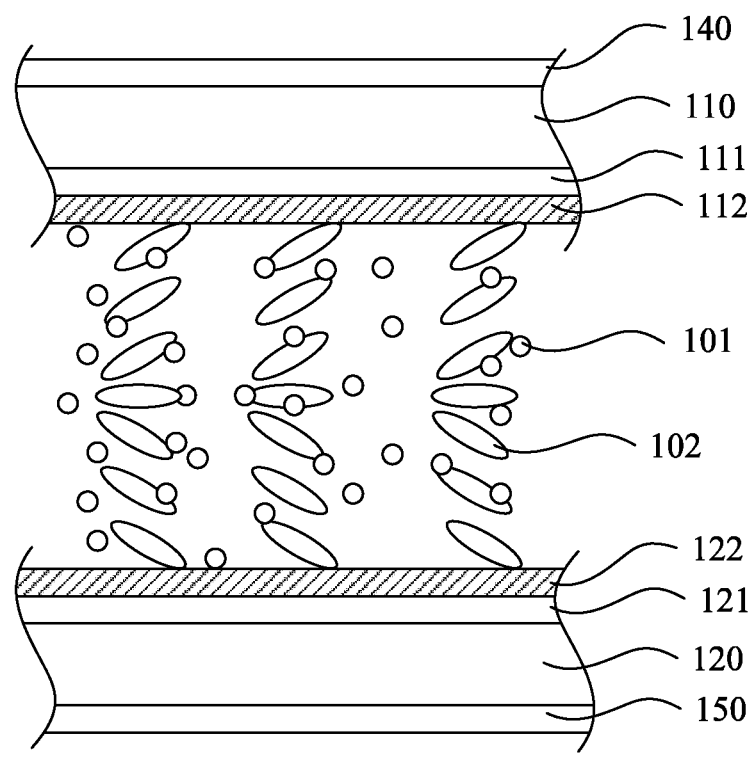
FIG. 4 is a partially cross-sectional view showing the OCB mode LCD panel according to the embodiment of the present invention before applying the electrical signal thereto.

Referring to FIG. 3 and FIG. 4, FIG. 4 is a partially cross-sectional view showing the OCB mode LCD panel according to the embodiment of the present invention before applying the electrical signal thereto. Subsequently, the liquid crystal layer 130 is formed between the first alignment layer 112 of the first substrate 110 and the second alignment layer 122 of the second substrate 120 (step S302), thereby forming a liquid crystal cell, wherein the liquid crystal layer 130 includes the reactive monomers 101 and a small amount of the liquid crystal molecules 102. In the step S302, the liquid crystal of the liquid crystal layer 130 can be dispensed within a sealant (not shown) on the first substrate by using, for example, one-drop filling (ODF) method. Subsequently, the second substrate 120 can be aligned and assembled with the first substrate 110 by using an alignment assembly apparatus (not shown), and the sealant is cured, thereby forming the liquid crystal layer 130 between the first substrate 110 and the second substrate 120. After the step S302, referring to FIG. 4, at this time, the liquid crystal molecules 102 are arranged in a splay state between the first substrate 110 and the second alignment layer 122.

Referring to FIG. 2 and FIG. 3 again, subsequently, an electrical signal is applied across the liquid crystal cell (step 303), such that at least a portion of the reactive monomers 101 and at least a portion of the liquid crystal molecules 102 can be oriented along the alignment direction and arranged in the bend state. With the use of the electrical signal (such as a voltage), the liquid crystal molecules 102 can be rotated. At this time, the liquid crystal molecules 102 which are close to the alignment layers 112, 122 can be oriented along the predetermined alignment direction and have the pre-tile angle. Therefore, the reactive monomers 101 mixed with the liquid crystal molecules 102 can also be oriented along the predetermined alignment direction and have the pre-tile angle. In this case, the applied electrical signal may be a direct current (DC) signal, an alternating current (AC) signal or a signal mixed of direct current and alternating current.

Referring to FIG. 2 and FIG. 3 again, subsequently, light rays are irradiated to the liquid crystal cell, such that the reactive monomers 101 are bonded to the first alignment layer 112 and the second alignment layer 122 to form the first polymer alignment layer 113 and the second polymer alignment layer 123, respectively (step S304). In this case, the irradiated light rays may ultraviolet (UV) light rays. At this time, with the use of applied electrical signal and the irradiated light rays, a phase separation occurs in the reactive monomers 101 and the liquid crystal molecules 102, and the reactive monomers 101 can be polymerized and react with the alignment layers 112, 122 of the substrates 110, 120, so as to form the polymer alignment layers 113, 123 on the alignment layers 112, 122, respectively, thereby forming the OCB mode LCD panel 100. At this time, the alignment layers 112, 122 and the polymer alignment layers 113, 123 can have the predetermined alignment direction and the pre-tile angle. Therefore, the liquid crystal molecules 102 of the liquid crystal layer 130 can be oriented along the alignment direction provided by the alignment layers 112, 122 and the polymer alignment layers 113, 123, and have the pre-tile angle.

In this embodiment, polymer chains of the first polymer alignment layer 113 and polymer chains of the second polymer alignment layer 123 both incline toward the same side of the liquid crystal cell. This is, the pre-tile angle θ of the first polymer alignment layer 113 and the pre-tile angle θ of the second polymer alignment layer 123 are formed at the same side of the liquid crystal cell, such that the liquid crystal molecules 102 are arranged in a bend state. For example, referring to FIG. 2 again, the polymer chains of the polymer alignment layers 113, 123 both incline toward a left side of the liquid crystal cell.

Figure 5:
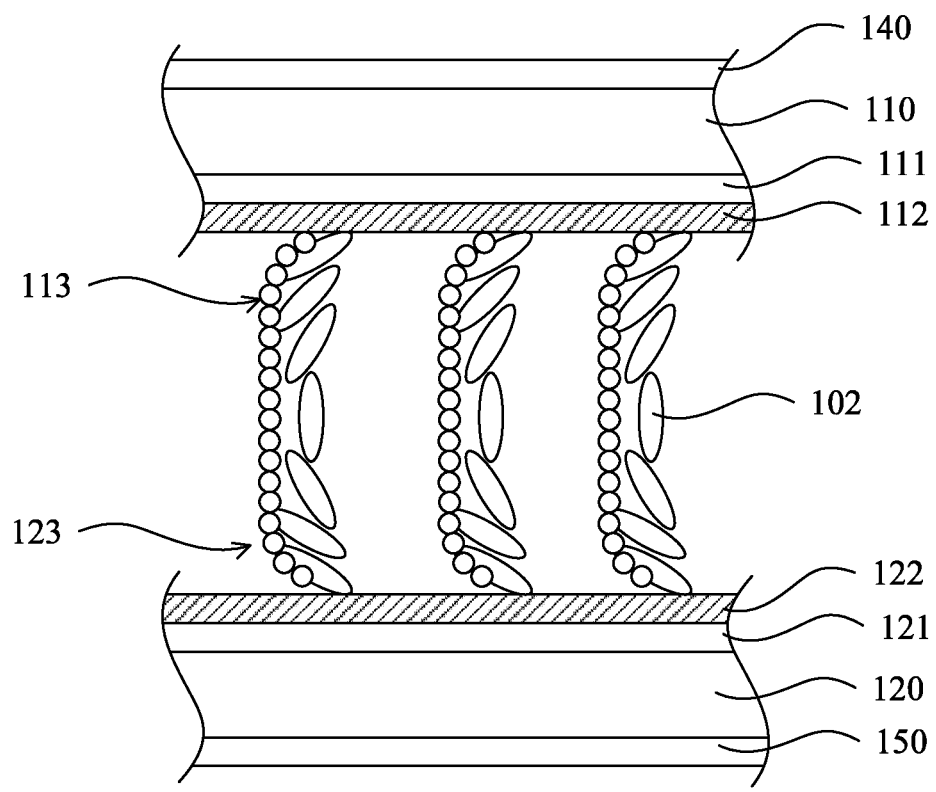
FIG. 5 is a partially cross-sectional view showing an OCB mode LCD panel according to another embodiment of the present invention.

Referring to FIG. 5, a partially cross-sectional view showing an OCB mode LCD panel according to another embodiment of the present invention is illustrated. In the step S304, a length of the polymer chains of the polymer alignment layers 113, 123 can be controlled by controlling a time of irradiating light rays. Referring to FIG. 5 again, in another embodiment, the polymer chains of the first polymer alignment layer 113 can be connected to the polymer chains of the second polymer alignment layer 123, so as to ensure the bend state of the liquid crystal molecules 102.

After forming the polymer alignment layers 113, 123, the irradiated light rays and the applied electrical signal can be removed. It is worth mentioning that, when removing the irradiated light rays and the applied electrical signal, the applied electrical signal can be first removed, and then the irradiated light rays are removed. Alternatively, the irradiated light rays and the applied electrical signal can be removed at the same time. In one embodiment, the incompletely-reacted reactive monomers 101 in the liquid crystal cell can be processed by irradiating light rays thereto or heating, so as to allow the residual reactive monomers 101 to react completely.

When the OCB mode LCD panel 100 is applied to manufacture the display apparatus, the display panel 100 can be disposed on the backlight module 200, thereby forming the OCB mode LCD apparatus.

In one embodiment, when forming the polymer alignment layers 113, 123, the liquid crystal cell can be heated, so as to replace the light irradiating step. When the liquid crystal cell is heated to a predetermined temperature, the reactive monomers 101 can be polymerized and react with the alignment layers 112, 122 of the substrates 110, 120, so as to form the polymer alignment layers 113, 123 on the alignment layers 112, 122, respectively.

Figure 6:
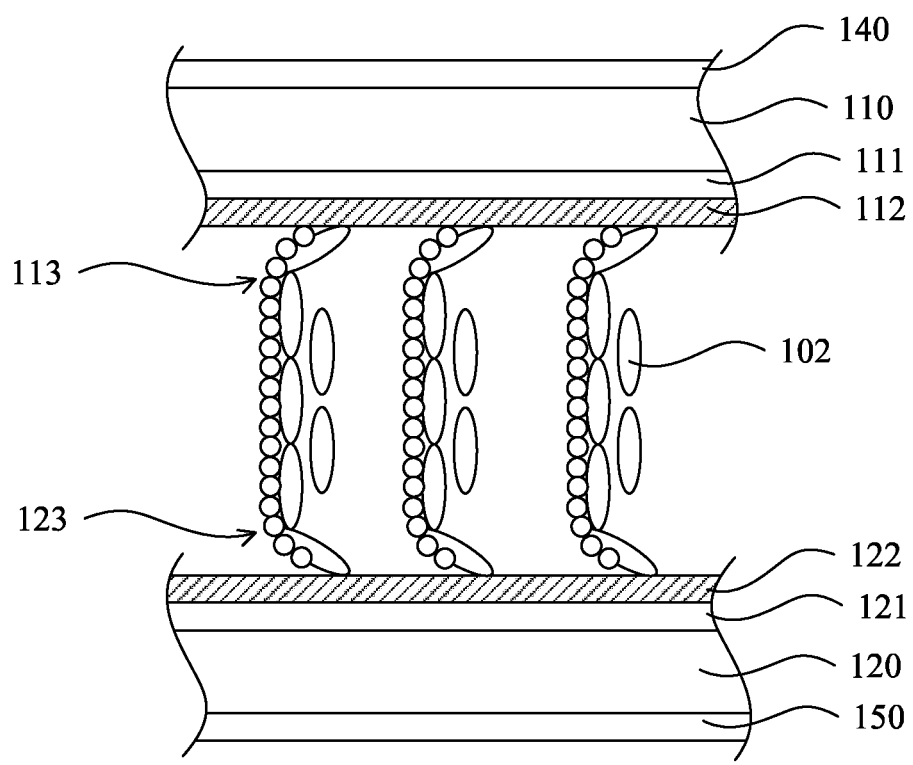
FIG. 6 is a partially cross-sectional view showing an OCB mode LCD panel according to a further embodiment of the present invention when raising an intensity of the electrical signal.

Referring to FIG. 6, FIG. 6 is a partially cross-sectional view showing an OCB mode LCD panel according to a further embodiment of the present invention when raising an intensity of the electrical signal. In a further embodiment, after applying the electrical signal across the liquid crystal cell and before forming the polymer alignment layers 113, 123, the intensity of the applied electrical signal (such as a voltage) can be raised for ensuring the bend state of the liquid crystal molecules 102. At this time, the liquid crystal molecules 102 which are positioned at the middle of the liquid crystal cell are substantially vertical to the alignment layers 112, 122.

As described above, the OCB mode liquid crystal display panel and the method for manufacturing the same can have pre-formed polymer alignment layers, such that the liquid crystal molecules of the liquid crystal cell can be pre-arranged in the bend state for reducing the phase transition time thereof from the splay state to the bent state, and thus improving the quality of the OCB mode liquid crystal display panel.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A method for manufacturing an optical compensated bending (OCB) mode liquid crystal display (LCD) panel, comprising the following steps:

forming a first alignment layer on a first substrate, and forming a second alignment layer on a second substrate;

forming a liquid crystal layer between the first alignment layer and the second alignment layer to form a liquid crystal cell, wherein the liquid crystal layer includes reactive monomers and liquid crystal molecules, and the liquid crystal molecules are arranged in a splay state;

applying an electrical signal across the liquid crystal cell such that the reactive monomers and the liquid crystal molecules are arranged in a bend state;

irradiating light rays to the liquid crystal cell such that the reactive monomers are bonded to the first alignment layer and the second alignment layer, so as to form a first polymer alignment layer and a second polymer alignment layer, respectively, wherein the first polymer alignment layer and the second polymer alignment layer have a pre-tile angle within a range of 0 to 10 degrees;

controlling a time of irradiating light rays to the reactive monomers of the liquid crystal cell, so as to control a length of polymer chains of the first polymer alignment layer and the second polymer alignment layer for allowing polymer chains of the first polymer alignment layer to be connected to polymer chains of the second polymer alignment layer; and irradiating light rays to or heating incompletely-reacted reactive monomers in the liquid crystal cell;

wherein, after applying the electrical signal across the liquid crystal cell and before forming the first polymer alignment layer and the second polymer alignment layer, an intensity of the applied electrical signal is raised.

2. The method according to claim 1, further comprising the follow step:

after irradiating light rays to the liquid crystal cell, removing the irradiated light rays and the applied electrical signal.

3. A method for manufacturing an optical compensated bending (OCB) mode liquid crystal display (LCD) panel, comprising the following steps:

forming a first alignment layer on a first substrate, and forming a second alignment layer on a second substrate;

forming a liquid crystal layer between the first alignment layer and the second alignment layer to form a liquid crystal cell, wherein the liquid crystal layer includes reactive monomers and liquid crystal molecules, and the liquid crystal molecules are arranged in a splay state;

applying an electrical signal across the liquid crystal cell such that the reactive monomers and the liquid crystal molecules are arranged in a bend state; and irradiating light rays to the liquid crystal cell such that the reactive monomers are bonded to the first alignment layer and the second alignment layer, so as to form a first polymer alignment layer and a second polymer alignment layer, respectively;

controlling a time of irradiating light rays to the reactive monomers of the liquid crystal cell, so as to control a length of polymer chains of the first polymer alignment layer and the second polymer alignment layer for allowing polymer chains of the first polymer alignment layer to be connected to polymer chains of the second polymer alignment layer;

wherein, after applying the electrical signal across the liquid crystal cell and before forming the first polymer alignment layer and the second polymer alignment layer, an intensity of the applied electrical signal is raised.

4. The method according to claim 3, further comprising the follow step:

after irradiating light rays to the liquid crystal cell, removing the irradiated light rays and the applied electrical signal.

5. The method according to claim 3, wherein the first polymer alignment layer and the second polymer alignment layer have a pre-tile angle within a range of 0 to 10 degrees.

6. The method according to claim 3, further comprising the follow step:

irradiating light rays to or heating incompletely-reacted reactive monomers in the liquid crystal cell.

* * * * *